United States Patent Office 3,305,509
Patented Feb. 21, 1967

3,305,509
ROOFING COMPOSITION OF RUBBER LATEX AND GLASS FIBER
Raymond R. Waterman, Monroe, and Donald C. Morris, Norwalk, Conn., assignors to Harry H. Miller, Redding Ridge, Conn.
No Drawing. Filed Dec. 6, 1962, Ser. No. 242,627
4 Claims. (Cl. 260—29.7)

This invention relates to novel rubber latex roofing compositions and to methods for the use of these compositions in the preparation and the repair of roofs. More particularly this invention relates to an easily applied neoprene latex composition incorporating glass fibers and which is especially suitable for application to modern built up roofs. The modern roof is composed of about four or more layers of asphalt or coal tar saturated paper felt, each layed being covered with coal tar or asphalt, these layers then being covered with a thick top layer covered with small stones or similar material to give abrasion resistance.

Such roofs, after prolonged exposure to the weather, dry out with portions of the felt underlayers becoming exposed. This, in many instances, results in the break-up of the exposed felt to produce ruptures in the roof.

Existing methods for repairing these roofs involve the use of coal tar pitch or asphalt. However, if coal tar pitch is used it must be applied hot (300°–350° F.) Use of asphalt can also involve similar hot treatment. In many cases the asphalt is applied after thinning with volatile solvents. This later method naturally involves a fire hazard and thus requires special and usually expensive insurance considerations. The asphalt can be applied as an emulsion and, although overcoming the fire hazard problem, generates a new problem in that the asphaltic tends to wash away and, furthermore, cold asphalt cracks since it has no creep properties.

It is well known that some of the deficiencies of asphalt roof compounds are alleviated by repairing extensively cracked and damaged asphalt roofs with an asphalt emulsion applied, as by "mopping," to glass fabrics which have been placed over the damaged parts. However, these fabrics require time consuming cutting and fitting, particularly around irregular shaped structures. Other problems with this method of repair involve "picking off," as by twisting off under a heel, and resultant failure of the repair composition to bridge or fill in the damage and provide a strong, continuous surface.

There is therefore a continuing need for a good, safe, all-purpose, single coat roofing compound which is capable of application to both old and new roofs. It is the primary object of this invention to provide such a composition.

This and the other objects of this invention, appearing more fully hereafter, are accomplished by providing a glass fiber-rubber latex roofing composition. Through deposition upon a roof of a single coat of this composition, a novel roof comprising a roof base and a coat of a glass fibrated rubber latex is produced.

It is preferred that the rubber latex constituent of the compositions of this invention be neoprene latex, since the coating compositions produced therewith result in a high tensile, high modulus, neoprene bonded glass fabric which is comparable to the structure formed by the two stage process of laying down glass fiber textiles and then mopping in an asphalt emulsion. Furthermore, this neoprene latex roofing composition is characterized by ease of application, good aging properties, low temperature flexibility and flame resistance.

In general, the roofing compositions in this invention contain, in addition to a glass fiber and a rubber latex, one or more of: a surface active agent, an antioxidant, a filling agent, a thickening agent, a wetting agent and a curing agent. These and the other ingredients of the compositions of this invention will be discussed more fully hereinafter.

It can be seen that the roofing compositions of this invention can be applied without preheating and, furthermore, do not contain volatile and flammable solvents. In this connection the compositions of this invention also have the advantage of providing a safe fire resistant roof coating. In addition, these roofing compositions result in a roof coating of high strength and high modulus and which, therefore, does not peel or pick off the roof or flashing.

The compositions of this invention are more fully demonstrated by the following examples, wherein all parts and percentages are by weight:

EXAMPLE I.—FIBRATED NEOPRENE LATEX ROOF COATING

| Latex Mix | Dry | Wet (aqueous) |
|---|---|---|
| 50% Neoprene latex [1] | 100 | 200 |
| 20% Emulphor ON solution [2] | 1 | 5 |
| 60% Zinc oxide dispersion [3] | 10 | 16.7 |
| 65% Clay slurry [4] | 100 | 154 |
| 65% Agerite Superlite emulsion [5] | 2 | 3.08 |

Add the ingredients in order listed using a propeller type mixer.

| | | |
|---|---|---|
| 2% Natrosol 250H [6] | 1 | 50 |
| Latex Mix | 213 | 378.8 |

Add the latex mix to the Natrosol Solution and mix in a Hobart Mixer until homogeneous.

| | | |
|---|---|---|
| Then add: ¼″ Glass fibers [7] | 75 | 75 |

Mix until glass fibers are wetted. (Latex is preferably thickened before adding glass fibers.)

[1] General purpose polychloroprene (2-chloro-1,3-butadiene) latex—Neoprene 842A latex.
[2] Polyoxyethylated fatty alcohol having a density of 1.03–1.04.
[3] Prepared by pebble milling 60 parts of French process zinc oxide with 1.8 parts Darvan No. 1 (sodium salts of polymerized alkyl naphthalene sulfonic acids—commercial dispersing agent), 0.6 part 28% ammonium hydroxide and 37.6 parts water.
[4] Prepared by mixing 65 parts McNamee Clay (Kaolin Clay) with 0.5 parts Darvan No. 1 (sodium salts of polymerized alkyl naphthalene sulfonic acids—commercial dispersing agent), 0.5 Darvan No. 7 (Polymerized sodium polymethacrylate—commercial dispersing agent), and 34 parts of water.
[5] 65% emulsion of polyalkyl polyphenol [polybutylated bis- (phenol-A)], a hindred phenol antioxidant.
[6] A water soluble hydroxyethyl cellulose, a 1% aqueous solution of which has a Brookfield viscosity at 25° C. of 1,500–2,500 cps.
[7] Commercial fiber glass chopped strand roving (Glass Fibers 872).

The foregoing latex composition when applied to a roof deposits a high tensile, high modulus, non-woven, neoprene bonded glass fabric in situ and is comparable to the structure formed by the two stage process of laying down woven or unwoven glass fiber textiles and then mopping in an asphalt emulsion.

This composition forms a particularly preferred embodiment of this invention since it is characterized by ease of application, good aging properties, low temperature flexibility and flame resistance.

The following example demonstrates the preparation of a neoprene latex top seal coat which is particularly useful in sealing roofs to prevent leakage or seepage of water therethrough.

EXAMPLE II.—NEOPRENE LATEX ROOF COATING (SEALANT)

| Latex Mix | Dry | Wet (aqueous) |
|---|---|---|
| 50.0% Neoprene latex [1] | 80 | 160 |
| 58.8% Butyl latex [2] | 20 | 34 |
| 20.0% Emulphor ON solution [3] | .5 | 2.5 |
| 60.0% Zinc oxide dispersion [4] | 10 | 16.7 |
| 60.0% Clay slurry [5] | 10 | 16.7 |
| 65.0% Nytal 100 slurry [6] | 50 | 77 |
| 65.0% Agerite Superlite emulsion [7] | 2 | 3.08 |
|  | 172.5 | 308.98 |
| Add other ingredients to neoprene latex in order listed while stirring with propeller type mixer. | | |
| 2.0% Natrosol 250H solution [8] | .2 | 10 |
| Add latex mix to Natrosol Solution slowly while stirring to prevent undispersed thickener. | | |

[1] General purpose polychloroprene (2-chloro-1,3-butadiene) latex—Neoprene 842A latex.
[2] A stable aqueous emulsion of butyl rubber (an isobutylene/isoprene copolymer having 1.5 to 2.0 mol percent residual unsaturation): Enjay Butyl MD-600DC.
[3] Polyoxyethylated fatty alcohol having a density of 1.03–1.04.
[4] Prepared by pebble milling 60 parts of French process zinc oxide with 1.8 parts Darvan No. 1 (Sodium salts of polymerized alkyl naphthalene sulfonic acids—commercial dispersing agent), 0.6 part 28% ammonium hydroxide and 37.6 parts water.
[5] Prepared by mixing 65 parts McNamee Clay (Kaolin Clay) with 0.5 part Darvan No. 1 (sodium salts of polymerized alkyl naphthalene sulfonic acids—commercial dispersing agent), 0.5 Darvan No. 7 (Polymerized sodium polymethacrylate—commercial dispersing agent), and 34 parts of water.
[6] Prepared by mixing 65 parts Nytal 100 (a talc consisting of the mixed oxides of silicon, calcium and magnesium), with 1.3 parts Darvan No. 1 (sodium salts of polymerized alkyl naphthalene sulfonic acids—commercial dispersing agent) and 33.7 parts water.
[7] 65% emulsion of polyalkyl polyphenol [polybutylated bis- (phenol-A)], a hindered phenol antioxidant.
[8] A water soluble hydroxyethyl cellulose, a 1% aqueous solution of which has a Brookfield viscosity at 25° C. of 1,500–2,500 cps.

When a coating of the glass fiber latex composition of Example I was spread on a substrate (such as a roof) dried and overcoated with the neoprene butyl latex sealant of Example II, the resultant glass fibrated rubber latex composition had a Mullen burst strength of approximately 100 p.s.i. and withstood 20 p.s.i. hydrostatic pressure. Furthermore, the coating withstood penetration by an 8" column of water for twenty days without leakage or seepage. The tensile strength of the coating was 2500 p.s.i.

Similar roofing compositions can be produced through the employment of other ingredients than those set forth in the foregoing examples, the above compositions, however, being highly preferred for the reasons set forth. Thus in place of the Emulphor emulsifying agent other emulsifying agents can be employed. These agents are well known in the art and need not be detailed here. For example, the sodium salts of alkylated aromatic sulfonic acids, sulfated fats and oils, monoglycerides and other polyhydric alcohol esters and ethers, water-soluble cellulose derivatives; surface-active agents such as quaternary ammonium compounds, and the like emulsifying and surface active agents can be employed in this invention.

Other antioxidants which can be employed are any of the well-known rubber antioxidants, generally of the aromatic amine type, but also of the substituted phenolic compound type such as butylated hydroxyanisole, di-tert-butyl-para-cresol, propyl gallate and the like.

In addition to zinc oxide, other curing agents or accelerators can be employed. Exemplary of these are: diphenyl guanidine, zinc dimethyldithiocarbamate, calcium oxide, magnesium oxide and the like.

Any wetting agent can be employed in the compositions of this invention so long as the agent is not reactive with the other ingredients thereof. Thus soaps, detergents, surface active agents and the like can be utilized. In many cases, the same compound can be employed as both the emulsifying agent and wetting agent.

Other well-known thickeners, such as cellulose ethers of low methoxy content, can be employed as thickening agents in the compositions of this invention.

Neoprene latex is preferred in the roofing compositions described herein because of the excellent results achieved therewith. However, other rubber latex compositions can be employed. These can be natural rubber which is essentially a rubbery polymer of isoprene, such as caoutchouc and the like, or a sulfur-vulcanizable synthetic rubber, such as the rubbery polymers of open-chain conjugated diolefins having from 4 to 8 carbon atoms exemplified by butadiene-1,3; 1,4-dimethyl butadiene-1,3; 2,3-dimethyl butadiene-1,3, and the like, or the copolymers of these and similar conjugated diolefins with each other or with copolymerizable monomeric materials containing a single ethylenic linkage such as acrylonitrile, styrene, methyl acrylate, ethyl acrylate, methyl methacrylate, ethyl methacrylate, isobutylene, 2-vinyl pyridine, or similar materials.

The proportions of the ingredients contained in the roofing compositions of this invention are preferably maintained within certain ranges in order to achieve optimum results. Thus, for example, it is preferred to employ the rubber latex constituent in a ratio of 1.2:1 to about 1.5:1 (1.3:1 being especially preferred) with respect to the glass fiber constituent. However, this ratio can range from about 1:1 to about 2:1 or greater of said rubber latex to the glass fiber ingredient.

The proportions of the remaining ingredients of the roofing composition of this invention can vary and in general the proportion employed is determined by economics. This is to say in general the minimum amount which will result in a roofing composition of the kind and quality described herein. Thus, the surface active agent generally comprises between about 0.1–1.0 percentage by the weight of the total dry weight of the roofing composition. The anti-oxidant can be employed in an amount ranging from about 0.2% to about 1.0% of the total dry weight of the roofing composition. The filling agent ranges from about 5% to about 30% of the total dry weight of the roofing composition; the thickening agent from about 0.1% to about 1.0%; and the curing agent from about 0.1% to about 1.5%.

What is claimed is:
1. A roofing composition suitable for one coat application comprising rubber latex, having glass fiber dispersed therein.
2. A novel roof comprising a roof base and a single coat of a composition comprising rubber latex, and glass fiber dispersed therein.
3. The composition of claim 1 wherein said rubber latex is polychloroprene latex.
4. A method for repairing asphalt roofs which comprises depositing thereon a single coating of a roofing composition comprising rubber latex and glass fiber.

References Cited by the Examiner

UNITED STATES PATENTS

| 1,642,316 | 9/1927 | Wardell | 50—196 |
| 2,564,882 | 8/1951 | Cubberley et al. | 156—293 |
| 2,605,242 | 7/1952 | Betts et al. | 260—29.7 |
| 2,676,155 | 4/1955 | Farris | 156—293 |

MURRAY TILLMAN, *Primary Examiner.*

LOUISE P. QUAST, *Examiner.*

J. ZIEGLER, *Assistant Examiner.*